US006374261B1

(12) United States Patent
Alvarez et al.

(10) Patent No.: US 6,374,261 B1
(45) Date of Patent: Apr. 16, 2002

(54) EXPERT SYSTEM KNOWLEDGE-DEFICIENCY REDUCTION THROUGH AUTOMATED DATABASE UPDATES FROM SEMI-STRUCTURED NATURAL LANGUAGE DOCUMENTS

(75) Inventors: Miguel O. Alvarez, Erie; Gokul Chander Prabhakar, Northglenn, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/289,682

(22) Filed: Apr. 9, 1999

(51) Int. Cl.[7] .............................................. G06F 17/30
(52) U.S. Cl. .......................... 707/200; 706/45; 706/50; 706/60
(58) Field of Search ............................. 706/45, 50, 60; 707/200

(56) References Cited

U.S. PATENT DOCUMENTS

| 5,542,024 A | * | 7/1996 | Balint et al. ................. 395/161 |
| 5,546,507 A | * | 8/1996 | Staub ........................... 395/76 |
| 5,720,008 A | * | 2/1998 | McGuinness et al. ......... 395/62 |
| 5,974,405 A | * | 10/1999 | McGuinness et al. ......... 706/45 |

OTHER PUBLICATIONS

"Automatic E–Mail Distributors", APTEX, *IP Telephony*, vol. 6, No. 11, pp. 143–144, Nov. 1998.
P. G. Chander, et al., "Using Goals to Design and Verify Rule Bases",*Decision Support Systems 21*, pp. 281–305, 1997.
P. G. Chander, On the Design and Evaluation of Rule–Based Systems, *PhD thesis*, Department of Computer Science, Concordia University, Montreal, Quebec, Canada, Jun. 1996.
John Debenham, "Expert Systems Designed for Maintenance", *Expert Systems with Applications*, vol. 5, pp. 233–244, 1992.
John Keeys Debenham, "A Structure for Expert Systems Maintenance", *Expert Systems with Applications*, vol. 11, No. 4, pp. 553–559, 1996.
Uma G. Gupta, "Validation and Verification of Knowledge–Based Systems: A Survey", Journal of Applied Intelligence vol. 3, No.4, pp. 343–363, 1993.
Alun D. Preece, "A New Approach to Detecting Missing Knowledge in Expert System Rule Bases", *International Journal of Man Machine Studies*, vol. 38, No. 4, pp. 661–688, 1993.
Ming Tan, "Telecommunications",*The Handbook of Applied Expert Systems*, Edited by Jay Liebowitz, CRC Press, pp. 24–1—24–12 (1997).
A Decentralized AI System for Transcript Applications. H. Hamburger, A. Lodgher, t.Maney, C.Jardine, F.Sift. 1990 IEEE, pp. 48–53.*
Teaching The Computer to Understand. Allport, G.; Jarratt, PI. 1988 IEEE/IEE, p. 8/1–8/2.*

* cited by examiner

*Primary Examiner*—Hosain T. Alam
*Assistant Examiner*—Tam Nguyen
(74) *Attorney, Agent, or Firm*—David Volejnicek

(57) ABSTRACT

Knowledge deficiency of an expert system (110) is alleviated by automating extraction of data that is relevant to the expert system's diagnostics knowledge database (112) and automatically and in an on-going manner updating the knowledge database with the extracted information. Evolving diagnostic knowledge in a domain is represented in the form of semi-structured natural-language reports (116). A computer-implemented tool (120) analyzes (206) a report to determine its kind, and then employs (222) an intelligent filter (124,126) corresponding to that kind of report to parse (224–244) the report's sections, to extract (226–244) data therefrom, and to perform consistency checks (228, 234) between sections on the extracted data. The computer then assembles (248) the extracted data into database records and includes (250) them in the knowledge database.

11 Claims, 8 Drawing Sheets

```
.PH " "
.de TP
.sp 1
..
.TP
.ll 7.3i
.po -.2i
.pl 11.5i
.ps 14
.B
.ce 1
System 75 (G1/G3) Posttest Product Performance Recommendation
.R
.ps
.sp 1
.TS
center box;
cp10w(0.4i)B | cp10w(5.8i)B
lp9w(0.4i)B | lp9w(5.8i)fCW.
```

FIG. 1B

```
Topic Description
─
─
PPR 74048.00 T{
(MT-DIG) MaintenanceTest Digital Port in use. Wait until yellow and
green LEDs are turned off on the MT-BD (MaintenanceTest circuit pack).
Retry the test. If problem persists, refer to MT-DIG (Maintenance Test
Digital Port) documentation.
T}
─
Pattern T{
In test 258, apply if maintenance object = TBRI-TRK and error code = 1024.
T}
─
Result ABORT
─
Error Log T{
T}
─
Comments T{
The TN2185 circuit pack contains eight, 4-wire ports that interface to the
network at the ISDN S/T reference point over two 64 Kb/s channels (B1 and B2)
and over a 16Kb/s signaling (D) channel. The B1 and B2 channels can be
simultaneously circuit switched, or individually packet switched. Only one
channel per trunk can be packet switched due to Packet Processing Element
(PPE) limitations. The D channel is either circuit switched or packet
switched. Packet switching uses the PPE to combine all D channels into a
single physical channel, which is then routed via the concentration highway to
the Network Control Element (NCE) and then to the TDM bus. The
circuit-switched connections have a Mu-law or A-law option for voice and
operate as 64Kb/s clear data channels. The packet-switched channels support
the LAPD protocol and conform with the CCITT Q.920 Recommendations for
D-channel signaling. . This test performs a far-end loop around to a far-end
switch over an ISDN trunk. The trunk's service state must be in-service,
maint-NE, or out-of-service/NE, and no call can be active on the trunk.. A
test call connection is established to a far-end switch over the ISDN trunk to
be tested. The digital port on a TN711D Maintenance/Test circuit pack
generates a test-pattern bit stream that is sent to the far-end switch and
echoed back. The received pattern is then compared to the sent pattern and
checked for errors that indicate a loss of integrity on the communications
path.. If a test call is running when scheduled maintenance starts, the green
LED is turned off. To determine if a test call is still running, use the list
isdn-testcall and status isdn-testcall commands. A lit yellow LED on the
Maintenance/Test circuit pack also indicates that a test call is running..
```

FIG. 1C

There are two methods available to place an outgoing ISDN Trunk-side BRI trunk test call. The test call connection is established over the TDM Bus of the transmit and receive sides of the ISDN Trunk-side BRI trunk to a data channel. This method is selected when no Maintenance/Test circuit pack resides in the system.. The test call connection is established over the TDM Bus of the transmit and receive sides of the ISDN Trunk-side BRI trunk to a digital trunk testing port on the Maintenance/Test circuit pack. The Maintenance/Test Digital Port generates a pseudo bit stream.. A test is run periodically to check if the call is hung. If so, it gracefully tears down the call to release the resources. Synchronous Commands. You can demand a synchronous outgoing test call by using the following maintenance commands.
3) test trunk trunk-group number/member long [repeat number]
4) test board UUCsspp long [repeat number]
5) test port port-location long [repeat number] Whenever a circuit translates to an ISDN Trunk-side BRI trunk during a Long Test Sequence, an outgoing test call is invoked, and the duration of the test call is 8.6 seconds. Once the test call completes, the bit error rate is retrieved from the Maintenance/Test Digital Port. A bit error rate greater than zero is reported as a failure to the Manager I terminal (MGRI). A failure indicates the need to run further diagnostics. If no Maintenance/Test circuit pack exists, the outgoing ISDN Trunk-side BRI trunk test call is established over a high-speed data channel on the Network Control (NETCON) circuit pack (DATA-BD). Asynchronous Commands Only one trunk can be tested in a given port network, until the test call is canceled or completes. TEST RESULT: (MT-DIG) MaintenanceTest Digital Port in use. Wait until yellow and green LEDs are turned off on the MT-BD (MaintenanceTest circuit pack). Retry the test. If problem persists, refer to MT-DIG (Maintenance Test Digital Port) documentation.
T}

Originator & Date Definity Mnt Man 04/20/98 -PPRGEN MKB

Status EXPERIMENTAL

Keywords TBRI-TRK

Applies To CSI, D92 Small, & G3R, V1-V5

Error Log Index

Text Index

Comment Index

.TE

```
#post_ppr/post_ppr.1
TBRI-BD98|738|ABORT|205|n|n|71224.00|
TBRI-BD92|738|ABORT|205|n|n|71224.00|
TBRI-BD31|738|ABORT|205|n|n|71224.00|
#post_ppr/post_ppr.2
TBRI-TRK98|258|ABORT|1024|n|n|74048.00|
TBRI-TRK92|258|ABORT|1024|n|n|74048.00|
TBRI-TRK31|258|ABORT|1024|n|n|74048.00|
TBRI-TRK|258|ABORT|1024|n|n|74048.00|
#post_ppr/post_ppr.3
Warning: PPR pattern may not contain any reference to MO's (73968.00)!
Warning: Possibly corrupted PPR pattern: 73968.00
595,applyifmaintobject=TBRI-BD98|595|ABORT|2000|n|n|73968.00|
595,applyifmaintobject=TBRI-BD92|595|ABORT|2000|n|n|73968.00|
595,applyifmaintobject=TBRI-BD31|595|ABORT|2000|n|n|73968.00|
Warning: Approximations made while extracting data: PPR (73968.00)
#post_ppr/post_ppr.4
Warning: PPR pattern may not contain any reference to MO's (73515.00)!
Warning: Possibly corrupted PPR pattern: 73515.00
505,applyifMO=TBRI-TK98|505|ABORT|2050|n|n|73515.00|
505,applyifMO=TBRI-TK92|505|ABORT|2050|n|n|73515.00|
505,applyifMO=TBRI-TK31|505|ABORT|2050|n|n|73515.00|
Warning: Approximations made while extracting data: PPR (73515.00)
```

*FIG. 5*

```
#post_ppr/post_ppr.3
=TBRI-BD98|595|ABORT|2000|n|n|73968.00|
=TBRI-BD92|595|ABORT|2000|n|n|73968.00|
=TBRI-BD31|595|ABORT|2000|n|n|73968.00|
Warning: Approximations made while extracting data: PPR (73968.00)
#post_ppr/post_ppr.4
Warning: PPR pattern may not contain any reference to MO's (73515.00)!
Warning: Possibly corrupted PPR pattern: 73515.00
505,applyifMO=TBRI-TK98|505|ABORT|2050|n|n|73515.00|
505,applyifMO=TBRI-TK92|505|ABORT|2050|n|n|73515.00|
505,applyifMO=TBRI-TK31|505|ABORT|2050|n|n|73515.00|
Warning: Approximations made while extracting data: PPR (73515.00)
```

*FIG. 6*

```
#post_ppr/post_ppr.4
=TBRI-TK98|505|ABORT|2050|n|n|73515.00|
=TBRI-TK92|505|ABORT|2050|n|n|73515.00|
=TBRI-TK31|505|ABORT|2050|n|n|73515.00|
Warning: Synonym expansion occurred for data match: PPR 73515.00
Warning: Approximations made while extracting data: PPR (73515.00)
```

*FIG. 7*

PPR nnnnn B-Channel Rejection Event. This action causes the Service State Audit, the Call State Audit, and the Test Call Audit to be executed.

PPR mmmmm Run the short test sequence first. If all tests pass, run the long test sequence. Refer to the appropriate PPR for any test that does not pass.

*FIG. 8*

EXPERT SYSTEM KNOWLEDGE-DEFICIENCY REDUCTION THROUGH AUTOMATED DATABASE UPDATES FROM SEMI-STRUCTURED NATURAL LANGUAGE DOCUMENTS

TECHNICAL FIELD

This invention relates to expert systems.

BACKGROUND OF THE INVENTION

Two types of bottlenecks occur in the life-cycle of an expert system: one is called the "knowledge-acquisition bottleneck", and the other is called the "knowledge-update bottleneck." The former refers to how initial knowledge is obtained from domain experts in order to develop an expert system. The latter, also known as knowledge deficiency (or, simply, deficiency), refers to how knowledge evolutions in the domain can be captured to keep an expert system up-to-date for problem solving. The knowledge-update bottleneck is quite critical in domains such as telecommunications where both products and operational knowledge evolve rapidly and the present know-how undergoes constant refinement.

Several methodologies exist for developing and maintaining expert systems and for detecting anomalies, including knowledge deficiency, in a rules database. Not enough work has been done to automate and generalize the process of knowledge-deficiency reduction in expert systems, however. Often, the problem of fixing knowledge deficiency is handled at a high level where methodologies (not tools) provide support for expert-system maintenance. The common approach towards fixing knowledge deficiency in an expert system is to obtain, from time to time, information on the evolving knowledge in a domain and to update the knowledge base manually. Unfortunately, in addition to being tedious and human-effort intensive, the rules-database modification often results in additional anomalies, notably inconsistency in the rules database. The general problem of automating knowledge-database updates to reduce knowledge deficiency is an on-going research effort. It is difficult to provide a generic (that is, a domain-independent) solution to this problem, owing to the widely-varying characteristics of different domains. However, it should be possible to provide a solution tailored to a specific domain that depends on the range and the type of problems that the expert system is designed to solve. Particularly in domains like telecommunications, where operational knowledge plays a critical role in the business, automation to tackle knowledge deficiency for expert systems in the domain could result in considerable savings of cost and effort and could play a vital competitive role.

SUMMARY OF THE INVENTION

This invention is directed to meeting the needs and solving the problems of the prior art. According to the invention, the knowledge-deficiency problem is alleviated by automating the extraction of data relevant to the expert system's diagnostics knowledge database, and automatically updating the knowledge database with the extracted information. More generally according to the invention, a knowledge database that stores information pertaining to a subject (for example, to a target of an expert system) is automatically updated as follows. In response to obtaining a file of information (for example, a product performance recommendation or some other "document" that pertains to the subject), the file is analyzed (e.g., parsed) by computer to identify therein types of information pertaining to the subject (such as different sections of the document, for example). The information of the identified types is then analyzed (e.g., parsed) by computer to identify therein items of information (such as particular fields, or data items) for storage in the knowledge database. The computer extracts found items of information from the file, and arranges them by their types into a database record in the knowledge database. Illustratively, the file is a semi-structured data entity (for example, a document such as the product performance recommendation) that comprises a plurality of types of information that are predefined and at least some of which comprise information expressed in natural language form. Preferably, the computer checks at least some of the identified items of information for consistency between a plurality of the identified types of information, and generates a warning if it determines inconsistency. The file of information may be of one kind or another (for example, a pre-test or a post-test product performance recommendation), and the computer preferably analyzes the file to determine its kind and then performs subsequent analyses using a program-implemented information filter that corresponds to the determined file kind. Having separate filters for different kinds of files greatly simplifies implementation.

The invention encompasses both a method and an apparatus. While the method comprises the steps of the just-characterized procedure, the apparatus effects the method steps. The invention further encompasses a computer-readable medium containing instructions which, when executed in a computer, cause the computer to perform the method steps.

Illustratively, evolving diagnostic knowledge in a domain is represented in the form of semi-structured natural-language reports (generated by, e.g., product development), illustratively called Product Performance Recommendations (PPRs). Every generated PPR represents a fragment of diagnostic knowledge that the expert system should be made aware of. The arrangement reduces the expert system knowledge deficiency by automatically extracting relevant data from the PPRs and updating expert system knowledge databases to keep expert-system diagnostics up-to-date. The arrangement employs intelligent filters that analyze and extract data from the PPRs. Since the extraction process is automated, errors—such as typos and inconsistencies—that can creep in as part of manual insertions and updates to the database, are avoided. This significantly improves the accuracy and reliability of the knowledge-update process. Since the expert system's PPR referrals are kept up-to-date with greater accuracy and reliability, there is a resulting reduction in knowledge deficiency which provides considerable improvement in the overall diagnostic efficiency of the expert system. This in turn helps in fixing product problems faster, better, and cheaper, resulting in improved customer satisfaction.

These and other features and advantages of the invention will become more apparent from the description of an illustrative embodiment of the invention considered together with the drawing.

BRIEF DESCRIPTION OF THE DRAWING

FIGS. 3 and 4 are a flow diagram of operations of the knowledge deficiency reduction tool in processing a pre-test PPR file;

FIG. 5 is an example of four entries of a knowledge database of the computer of FIG. 2 generated by the tool of FIG. 3 by performing PPR parsing using strict matching;

FIG. 6 is an example of two entries of the knowledge database generated by the tool by performing PPR parsing using relaxed matching;

FIG. 7 is an example of an entry of the knowledge database generated by the tool by performing PPR parsing using most relaxed matching; and FIG. 8 is an example of PPR sections of two pre-test PPRs.

DETAILED DESCRIPTION

Brief History

The PPR process is an existing effort to increase the diagnostic effectiveness of an expert system by providing to technicians recommendations for repairs whenever product problems cannot be resolved by the expert system itself. PPRs are generated by product developers for use by service technicians. The typical usage of the PPRs for supplementing expert system diagnostics is as follows. An expert system performs a test on the product, processes the results of the test, finds the associated PPR number, and writes it onto a trouble ticket to instruct a technician who is working this trouble ticket what to do. Technicians find the PPR database, which is referenced by the PPR numbers, to be an excellent source of the most up-to-date diagnostic information and use it to resolve troubles associated with products. The PPR database may be expanded to include recommendations for problems that cannot or should not be tested, but can be identified via hardware-error-log information. In addition, expert systems have been trained to do more than recommend a PPR based on a single test result. In certain instances, they make a recommendation or a set of recommendations based on broader considerations such as the error status of related resources, specific patterns of errors or test results, and the results of multiple tests.

As understanding of how to solve problems in the domain improves over time, new PPRs are generated that pertain to product changes (such as new hardware, new features, and new platforms), and the existing ones are constantly refined by using knowledge gained from the field and by consultation with the development community. PPRs represent a major source of evolving domain knowledge. This knowledge must be incorporated into the expert system in order to keep the expert system up-to-date. However, the rapid evolution of PPRs creates a knowledge-update bottleneck.

The Existing Approach

Figures 1, 1A:
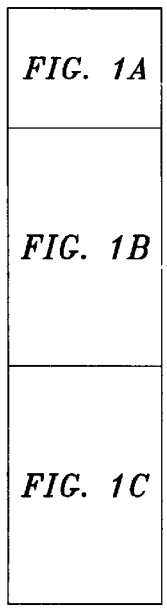
FIG. 1 is a listing of an illustrative prior-art PPR file.

A PPR is a semi-structured natural-language (text) report. An illustrative example of a PPR is shown in FIG. 1. Presently, there exist two kinds of PPRs: post-test and pre-test. Upon the creation (or modification) of a PPR, the print-out or electronic file of the report is sent to the expert-system developer. The developer then reads each and every PPR and then manually extracts data therefrom in a format that is suitable for updating the expert system's internal information database. Being a manual process, this is tedious, time-consuming, and error-prone. Moreover, the time lag from the time that a new or updated PPR reaches the expert system developer and the time that the expert system database is updated can be many weeks, depending upon the existing workload of the developer. Hence, the resulting deficiency in the system seriously limits the diagnostic ability of the expert system to generate up-to-date PPR referrals to the technicians.

Unfortunately, a simple procedure cannot be used to update the expert system database, because the information to be obtained from a PPR (be it pre-test or post-test) depends on a number of factors that complicate this extraction. These factors are outlined below.

1. The required diagnostic information in a PPR is distributed: that is, it is not lumped together at a single point in the PPR. Rather, the relevant data occurs at different places in the PPR.
2. The required data is embedded in free-form text: a PPR can be visualized as being semi-structured, because one can delimit the various sections in a PPR, but the contents of a section (such as Comments) are free-form text in which the data that is needed to update the expert system database is embedded.
3. The format of database entries to be generated varies depending on the type of PPR.
4. The number of target systems to which a PPR is applicable can result in single or multiple database updates (thus increasing the effort on the developer and the chances for error).
5. The number of target systems to which a PPR is applicable is variable (that is, it can grow/shrink over time).
6. The causality between the information that is extracted from a PPR affects certain other values that are needed for database updates.
7. In the long term, as the number of PPR types increases, the burden on the developer to update the expert database also increases, thus further aggravating the induced knowledge deficiency; thus, the delay between receipt of the PPR and expert database update increases (this, in turn, has a ripple effect of further reducing the diagnostic efficiency of the expert system).

The New Approach

Having identified the knowledge deficiency problem in the expert system, and its source, we realized that conventional techniques are not suited for extracting the information from a PPR. Instead, intelligent filters that mimic how the expert system developer reads an entire PPR and extracts the relevant information from its various sections (taking into account causality between information, if any) must be used. We also realized that a single filter is not desirable, because the format of the information-extraction and the type of information extracted varies between a post-test PPR and a pre-test PPR. Moreover, other PPR kinds could be introduced in the future as the entire PPR process matures and evolves over time. Hence, the strategy that we adopt to overcome this bottleneck through automation is as follows.

By obtaining the relevant information that is pertinent for an expert system for a given PPR kind, an appropriate filter that can act on the PPR is automatically invoked. The filter, using its built-in heuristics, analyzes the PPR and extracts the embedded data which is used by a database update module to update the expert system database. By keeping different filter modules, the system can process both pre-test and post-test PPRs (an appropriate filter is invoked after scanning and detecting the kind of PPR). This also makes the system modular and scalable to accommodate new PPR kinds: all that is needed is to write a new filter and invoke it based upon the new PPR kind detection. The database update module is independent of these filters; hence, we can handle database evolution as well (for example, if the expert system's database is upgraded to a new architecture, only the database update module needs to change).

The advantages of the implemented deficiency-reduction technique are summarized below:

Vast improvement in the diagnostic efficiency of the expert system because it is no longer dependent on a human for deficiency reduction;

Considerable reduction in the cycle time during which deficiency exists in the system;

Protection of the PPR process against personnel turnover, through automated database updates;

Increase in the overall productivity by reduction of the overall cost and effort: the expert system developer is no longer burdened with the chore of manually updating the expert system database from new/modified PPRs and can utilize the time saving on other needed enhancements to the system;

Adaptive and flexible accommodation of future PPR kinds; and

A precursor towards evolving standards for PPR creation and modification: the standards can facilitate ease in handling and extracting of the information automatically from the PPRs not only for switch expert systems but for other diagnostic expert systems as well.

Performance Validation of the New Approach

Initial results of one illustrative application of the new approach indicate that we are able to extract substantially 100% of the required information from the post-test PPRs, thereby completely eliminating the deficiency problem for post-test PPRs. For pre-test PPRs, the overall efficiency of information-extraction is close to 80% (that is, on average, out of 100 pre-test PPRs, 20 still require some form of minimal manual intervention). But, the reason for incomplete information extraction in the pre-test case is that some information pertinent to such PPRs has to come from the product manual—a source that is exterior to the PPR. (This also illustrates the difficulties in trying to solve the deficiency problem in expert systems through automated approaches). Even then, our extraction helps the developer to minimize the manual effort to be expended by extracting all other relevant information present in the PPR that should go into the database, and by putting placeholders in those data slots that need to be filled-in by the developer after consultation with the product manual (as opposed to manually extracting and filling all of the data slots for database updates from scratch).

General Filter Principles

Each filter uses a keyword-and phrase-based identification scheme to spot and extract data of interest from a PPR, and format it in a form suitable for updating the expert system database. In so doing, it typically tries to mimic, through its heuristics, the behavior of a human reading the document and extracting the embedded data. The developer who is using a filter can control, by using its command line options, the rigor of the concept-matching for data extraction. For example, the developer can take a conservative approach and look for perfect phrase and keyword matches, or he/she can relax that assumption and look for approximate matches (some examples of this type of extraction are given later). In addition, the filters also make use of some consistency checks that are necessary; these consistency checks are meant to avoid inadvertent data extraction errors, since the methods of extraction are heuristics and not algorithms. The data-matching and data-extraction are a part of a common utility library that the filters make use of, and are independent of the nature/type of the document; this improves the reusability of these methods for future filters.

The principle of each filter is broadly:
1. Identify the various parts of the PPR.
2. Check the header or the title to ensure that the document type is compatible with the kind of the filter. For example, a post-test PPR filter cannot operate on a pre-test PPR document.
3. Perform consistency checks and data extraction (filter specific). This is outlined separately for each filter below.

The various sections of a PPR are not continuous, make heavy use of the domain ontology, and do not necessarily strictly follow the English grammar. This nature of knowledge description in a PPR precludes the application of natural-language processing techniques.

Illustrative Embodiment

Figure 2:
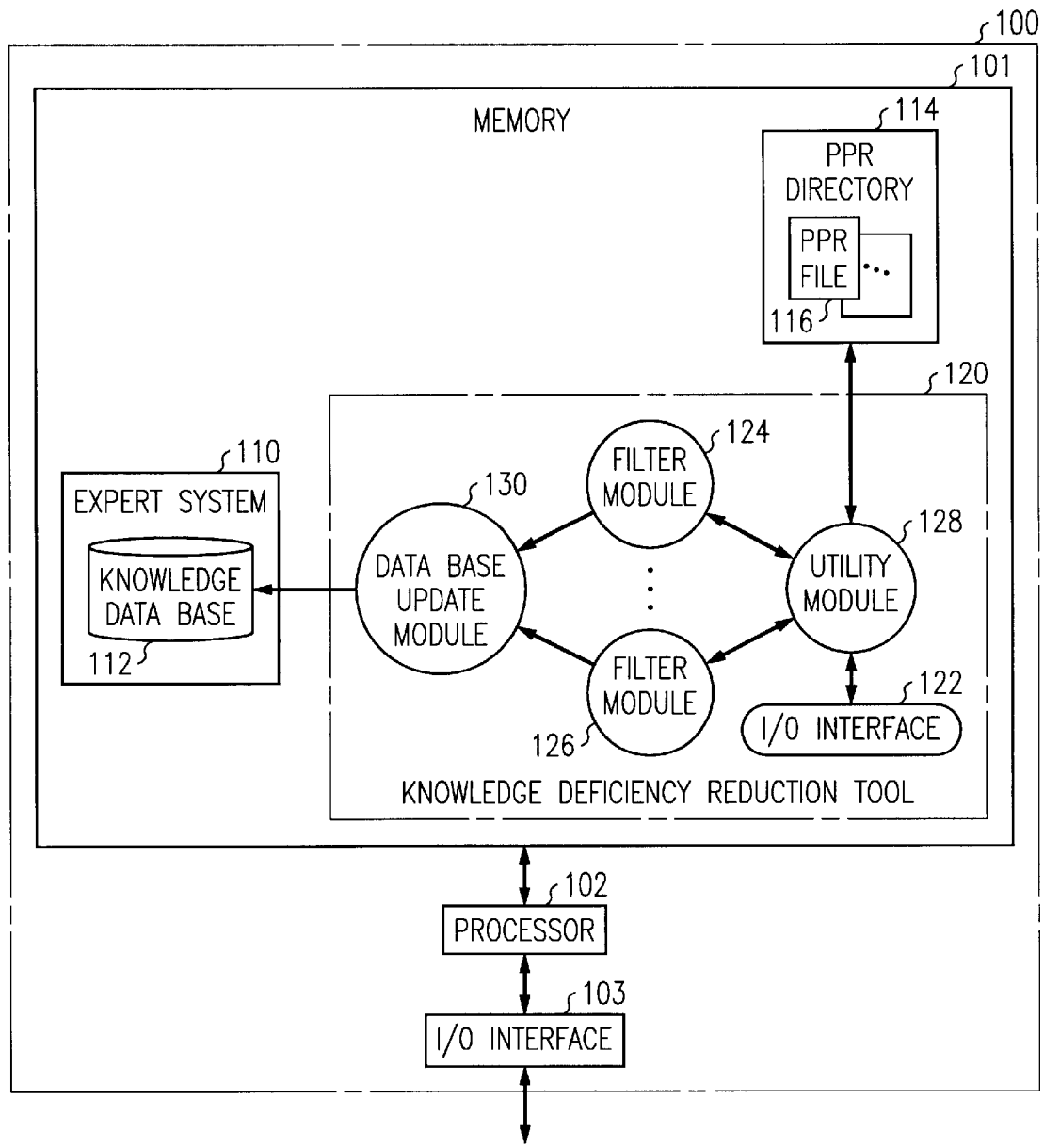
FIG. 2 is a block diagram of a computer that includes an illustrative embodiment of the invention.

FIG. 2 shows a computer 100 that includes an illustrative embodiment of the invention. Computer 100 is illustratively a conventional workstation. It comprises a memory 101 for storing programs and data, a processor 102 for executing programs and using data from memory 101, and an input and output (I/O) interface 103—for example, a display screen, a keyboard, etc.—for communicating with the outside world. Memory 101 includes a conventional diagnostics expert system 110 that includes a conventional knowledge database 112. It also includes a conventional PPR directory 114 that includes one or more PPRs 116 in computer (electronic) file form.

According to the invention, memory 101 further includes a knowledge database update tool 120 that updates knowledge database 112 with information extracted from PPR directory 114. Update tool 120 includes an I/O interface 122 by means of which it communicates through I/O interface 103 with an expert system developer (not shown), a plurality of filter modules 124–126 that define the information-extraction heuristics for a plurality of different PPR kinds, a utility module 128 that extracts information from PPRs 116 on behalf of filter modules 124–126, and a database update module 130 that updates knowledge database 112 with the information extracted by filter modules 124–126.

Figure 3:
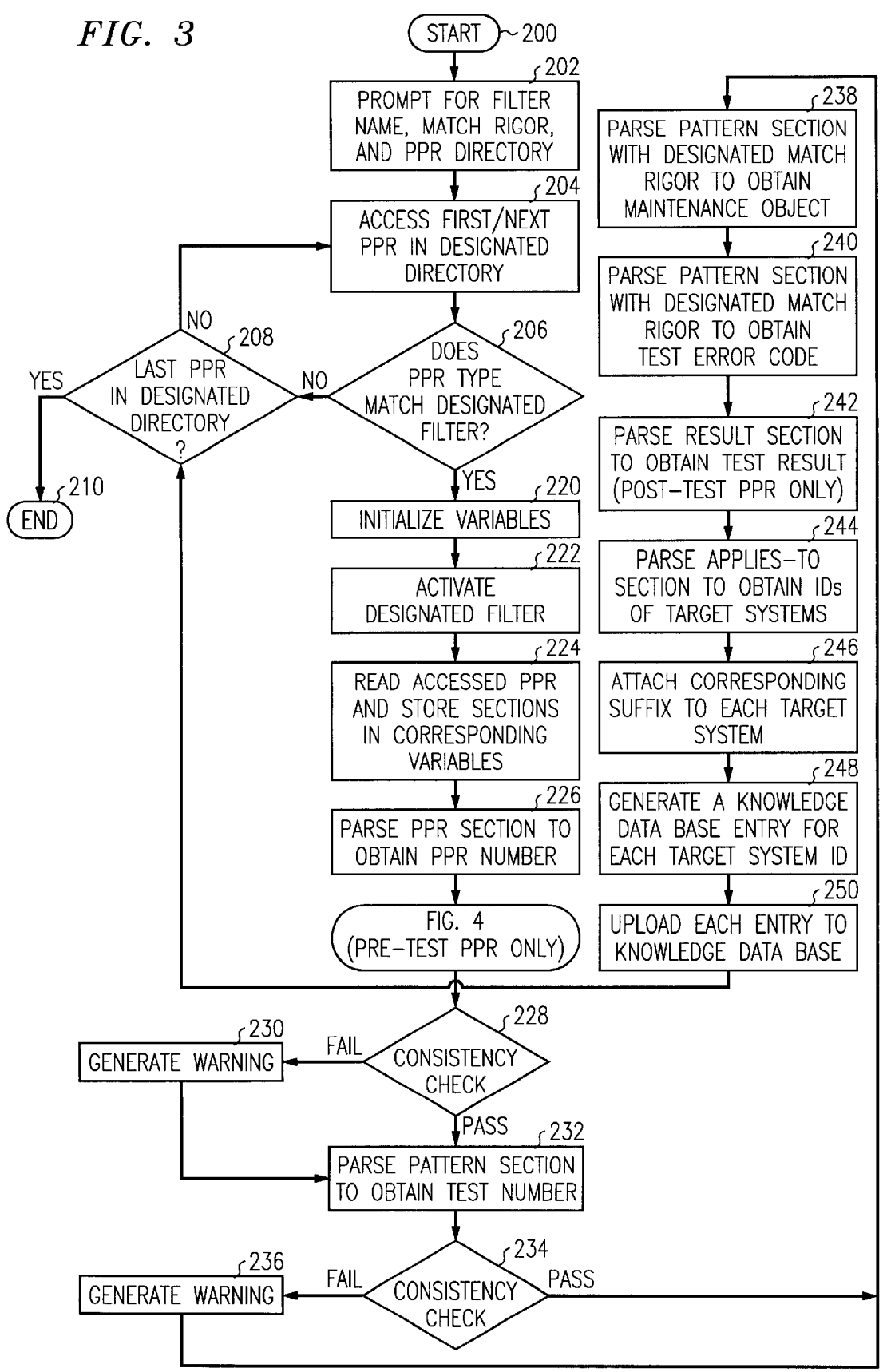
FIG. 3 is a flow diagram of operations of a knowledge deficiency reduction tool of the computer of FIG. 2 in processing a post-test PPR file.
Figure 4:
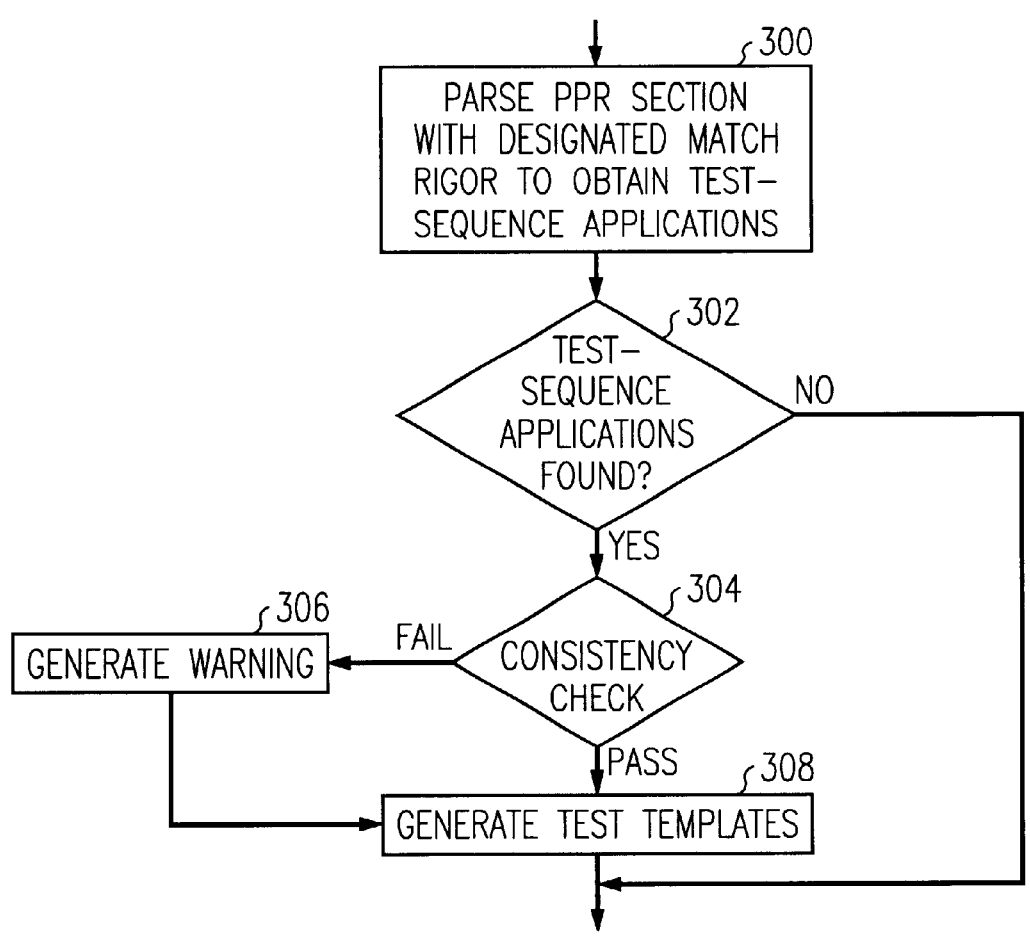

The operation of knowledge deficiency reduction tool 120 is illustrated in FIGS. 3–4. Upon tool 120 being invoked, at step 200 of FIG. 3, I/O interface 122 prompts the user of system 100 (the expert system developer) for the name of the one of the filter modules 124–126 that is to be used (e.g., post-test, pre-test, etc.), the level or degree of match rigor that is to be applied in PPR searches (e.g., exact match, substring expansion, or synonym match), and the name of a PPR directory 114 that is to be used, at step 202. In response to the user providing the prompted-for information, utility module 128 accesses a PPR 116 in the designated PPR directory 114, at step 204, and checks whether the PPR kind (e.g., pre-test, post-test, etc.) named in the title of the PPR 116 matches the designated filter 124–126, at step 206. If there is no match, module 128 checks, at step 208, whether the test of step 206 has been performed for all PPRs 116 in PPR directory 114. If so, execution of tool 120 ends, at step 210; if not, execution returns to step 204 to perform the test of step 206 on another PPR 116.

Returning to step 206, if the kind of the PPR 116 matches the designated filter 124–126, tool 120 proceeds to extract information from that PPR 116. Utility module 128 initializes local variables, at step 220, and activates the filter 124–126 that was designated by the user at step 202, at step 222. Henceforth, the operation of tool 120 is dependent upon which filter 124–126 was activated.

Post-Test PPR Filter 124

Filter 124 extracts data from a post-test PPR. The information it extracts pertains to the situation and result of a test performed on a product. More specifically, it extracts the maintenance object that is affected by the test, the test number, the error code associated with the test, the result, the systems to which the PPR is applicable, and the PPR number. Its operation is outlined below in relation to FIG. 3 only.

1. At step 224, filter 124 extracts the various sections (information types) of the PPR 116 (see FIG. 1) by using the appropriate keywords/phrases that identify a section, and stores them separately. The various sections represent the following information types: the PPR section, the Pattern section, the Comments section, the Keywords section, the Applies-to section, and the Result section. Each section will be parsed using keywords and phrases, as applicable for that section, that potentially indicate embedded data that are required by the expert system.

2. At step 226, filter 124 extracts the PPR number "nnnnn" (an item of information) from the PPR section. It does so by parsing the PPR section, looking for the string "PPR nnnnn" where each "n" is a digit. Then, filter 124 performs a consistency check on the contents of this section with the contents of the Comments section, at step 228, by checking whether the text of the PPR section is embedded in the Comments section after the keyword "Test Result". This is to ensure that the Comment section does not contain any information that is contrary to the PPR description. Any discrepancy results in a warning message being generated along with that PPR number, at step 230, but does not stop the tool 120 from extracting relevant data from this PPR 116 as described in the succeeding steps. The warning helps a developer to verify those PPRs that may have some kind of inconsistency between the PPR description and the associated comments.

3. At step 232, filter 124 parses the Pattern section to extract a test number (another item of information), by looking for text that appears between the keywords "text" and ",". A consistency check is made at step 234 to ensure that the keyword "test" precedes the keyword "apply" which in turn precedes the keyword "maintenance object" in the Pattern section. If the consistency check fails, filter 124 generates a warning message, at step 236. Filter 124 further parses the Pattern section to extract a maintenance object indicator, at step 238, and an associated error code, at step 240. Step 238 is performed by searching for text appearing between the keywords "maintenance object =" and "and". Step 240 is performed by searching for text appearing between the keywords "code =" and ".". The precision of these data matches and subsequent data extraction is determined by the level of match rigor specified in the command line. By default, the tool looks for an exact match. For example, FIG. 5 shows data extraction from four PPRs. The first two PPRs, including the second one which corresponds to the PPR of FIG. 1, resulted in exact matches, using exact matching. Note that for the last two PPRs that did not match specified data exactly, accuracy of data extraction suffered as a strict data match failed. FIG. 6 shows the data extraction for the last two PPRs of FIG. 5 (post_ppr.3 and post_ppr.4) after the developer relaxed the matching constraint, allowing the tool to match against expanded substrings and thus to extract better data for post_pr.3, though not for post_ppr.4. FIG. 7 shows further relaxation of the matching constraint for the second PPR of FIG. 6 that allowed matching against expanded substrings and against synonyms, and resulted in a better extraction for post_ppr.4. Whenever approximate matching occurs, the developer is preferably cautioned by means of a warning message so that any extraction errors can be spotted. In general, although data extraction using approximate matching may not be perfect, its level of accuracy is quite satisfactory. The different degrees of freedom provided in extracting data allow for greater flexibility and re-usability. Note, however, that there is a trade-off in the speed of data extraction when using approximate data matching (as it involves more computation).

4. At step 242, filter 124 parses the Result section to obtain the test result (another item of information). This parsing operation merely returns the contents of the Result section.

5. At step 244, filter 124 parses the Applies-to section to obtain the list of target systems to which the PPR applies (further items of information). In so doing, the tool takes care of the various delimiters that separate each system identifier to extract all the specified system identifiers. A typical entry looks like this:

Applies_To CSI, D92 Small & G3R

Note that the delimiters that separate individual system identifiers are not necessarily all identical.

6. At step 246, filter 124 finds a system suffix identifier (if any) for each identified target system from a pre-administered set of data, and attaches the suffix identifier to each corresponding system identifier. The suffix identifier is used by expert system 110 to distinguish between, and uniquely identify, different target system types. In so doing, care is taken to note when a system name is not a single word (e.g., "D92 Small", above). The pre-administered data is preferably stored in a table and is looked up to determine the system identifier for each system that is to have an entry in the expert system database. Not all systems have a system-identifier suffix, and some specified (e.g., experimental) systems are discarded by the tool.

7. For every such system with a valid suffix, filter 124 assembles the extracted information into an appropriate database entry or record, at step 248. Typical database entries generated for a post-test PPR are shown below:

TBRI-TRK98| 258| ABORT| 1024| n| n| ABCDE|
TBRI-TRK92| 258| ABORT| 1024| n| n| ABCDE|
TBRI-TRK31| 258| ABORT| 1024| n| n| ABCDE|
TBRI-TRK| 258| ABORT| 1024| n| n| ABCDE|

This means that TBRI-TRK is the general maintenance object for this PPR and the PPR ABCDE is applicable to four target systems, identified by the first field in the above strings, for test 258 that aborted with error code 1024. (The two other fields (n, n) are blank and are used internally by the expert system.)

8. At step 250, database update module 130 uploads and stores the entries that were created at step 248 into knowledge database 112, and tool 120 returns to step 208 to process another PPR 116.

Pre-Test PPR Filter 126

The pre-test PPR provides indications of situations and the types of tests that are applicable to these situations. The expert system uses this information to apply these tests accordingly. In cases where such tests are not safe (e.g., Where a test is destructive), the PPR number is referred to by the technician for his/her further action. In this case, filter 126 obtains information that identifies a situation and the test that is applicable to that situation. More specifically, filter 126 extracts the PPR number, the error type, the maintenance object involved, auxiliary data as applicable, and the systems to which this PPR/test is applicable. Its operation is outlined below in relation to FIGS. 3–4.

1. At step 224, filter 126 extracts the various sections (types of information) of the PPR 116 (see FIG. 1) by using the appropriate keywords/phrases that identify a section, and stores them separately. The various sections represent the following information types: the PPR section, the Pattern section, the Comments section, the Keywords section, and the Applies-to section. The way in which these sections differ from a post-test PPR is the way in which data is embedded in them. Each section is parsed by using keywords and phrases, as applicable for that section, that potentially indicate embedded data that are required by the expert system.

2. At step 226, filter 126 extracts the PPR number from the PPR section, in the manner described for post-PR filter 124, above. Filter 126 then parses the PPR section to determine presence of test-sequence applications (i.e., descriptions), for example, by checking for presence of phrases like "short test", "long test", "test sequence", etc., at step 300 of FIG. 4. Note that we need to use certain phrases for identifying test-sequence applications, because simple keyword-based analysis (say, checking for single keywords like "test", "apply", etc.) can incorrectly identify a test application even though there isn't any. For illustration, refer to FIG. 8 that portrays the PPR section of two pre-test PPRs. The first one (PPR nnnnn) does not represent the application of a test-sequence, even though it includes keywords like "test", "call", and "audit", whereas the second one (PPR mmmmm) does. If test-sequence applications are found to be present, as determined at step 302, a consistency check is made at step 304 to ensure that the test-sequence applications appear in the Comments section as well. If the consistency check fails, filter 126 cautions the developer by generating a warning message, at step 306. The precision of these data matches is determined by the level of match rigor specified in the command line, at step 202. If test-sequence applications were found to be present at step 302, filter 126 further generates templates for them, at step 308. Each template is a place holder for one of the found test-sequence applications, and provides for subsequent (usually manual) entry of the test type, test number, and the number of test repetitions. Following step 308, or if no test-sequence applications were found at step 302, filter 126 makes a consistency check by cross-referencing all of the information in the PPR section with the Comments section (similar to post-test PPR), at step 228 of FIG. 3, and generating a warning message if all of the PPR section information does not appear in the Comments section, at step 230.

3. At step 232, filter 126 parses the Pattern section to extract auxiliary data by looking for the phrase "auxiliary data" and/or its abbreviations or synonyms. Auxiliary data is optional information that is provided for experts and/or technicians and generally conveys in-depth information about the test. A consistency check is made at step 234 by cross-referencing this information against the keywords section, to ensure that there is no mismatch. If the consistency check fails, filter 126 generates a warning message, at step 236. Filter 126 further parses the Pattern section to extract a maintenance object indicator, at step 238, and an associated error code, at step 240, in the manner described for filter 124, above. The precision of these data matches and data extractions is determined by the level of match rigor specified in the command line, as in the case of post-test filter 124.

4. Step 242 is not performed, because the test has not yet been applied and hence there is no test result.

5. If no test-sequence application was indicated in the PPR section, in step 302 of FIG. 4., then no tests are applicable. Hence, filter 126 sets test-type to N (to indicate to the expert system that no test is applicable with respect to this PPR entry). Otherwise, the test type, the test number, and the number of times that it is to be repeated are noted as template symbols, as this information is not available from a pre-test PPR.

6. At step 244, filter 126 parses the Applies-to section to obtain the list of target systems to which the PPR applies. In so doing, the tool takes care of the various delimiters that separate each system identifier to extract all the specified system identifiers. A typical entry looks like this:

Applies-To D92 Small, and G3R

Note that the delimiters that separate system identifiers not necessarily identical.

7. At step 246, filter 126 finds a system suffix identifier (if any) for each identified system, in the manner described for filter 124. In so doing, care is taken to note when a system name is not a single word (e.g., see "D92 Small", above). The suffix identifier information is pre-administered in a table, and is looked up to determine a system identifier for each system that is to have an entry in the expert system database. Not all systems have a system-identifier suffix, and some specified (experimental) systems are discarded by the tool.

8. For every system with a valid suffix, filter 126 assembles the extracted information into an appropriate database entry, at step 248. Typical database entries generated for a pre-test PPR that does not have test-sequence applications (i.e., does not involve application of tests) are shown below:

TBRI-TRK98| 3841| NIL| n| ABCDE| 0| 0| y| y|
TBRI-TRK92| 3841| NIL| n| ABCDE| 0| 0| y| y|
TBRI-TRK31| 3841| NIL| n| ABCDE| 0| 0| y| y|

This means that the above PPR ABCDE is applicable to three systems, identified by the first field, with error type of 3841 with no auxiliary data (NIL). The two zeros indicate that no tests are applicable to this case. For pre-test PPRs that do not involve application of test sequences, the data extraction is 100%. However, if the PPR description indicates test-sequence applications, then the tool produces templates in the data slots above to fill the test type, test number, and the number of times that the test should be repeated. An example output from a pre-test PPR that involves test application is shown below:

ATTE-PT92| 0| 0| X| ABCDE| N| R| y| y|
ATTE-PT92| 0| 0| X| ABCDE| N| R| y| y|

In this case, the symbols X, N, and R are the test type, test number, and the number of times that it has to be repeated, respectively. This information, as it is not present in the PPR, has to be manually entered by the developer after consulting with the product manual.

9. At step 250, database update module 130 uploads and stores the entries that were created at step 248 into knowledge database 112, and tool 120 returns to step 208 to process another PPR 116.

Of course, various changes and modifications to the illustrative embodiment described above will be apparent to those skilled in the art. For example, the invention can be applied to extracting information from any natural-language document that has embedded data that is specifiable by keywords and/or phrases. The technique could conceivably become a precursor to a standard for knowledge-deficiency reduction. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of automatically updating a knowledge base comprising a database that stores information pertaining to a subject, comprising:

in response to obtaining a file of information that is at least in part expressed in natural-language form, analyzing the file by computer to identify therein types of information pertaining to the subject;

analyzing by computer the information of the identified types by executing an intelligent filter that uses heuristics to identify therein items of information for storage in the knowledge database;

extracting by computer the found items of information from the file;

arranging by computer the extracted items by their types into a database record; and storing by computer the database record in the knowledge database.

2. The method claim 1 wherein:

the knowledge database is a knowledge database of an expert system;

the subject comprises a target of the expert system; and the file contains information pertaining to the subject.

3. The method of claim 2 wherein:

the subject comprises a plurality of targets of the expert system;

the step of arranging comprises determining from an extracted item which ones of the plurality of the targets the file pertains to, and creating a separate database record for each of the ones of the plurality of the targets; and the step of storing comprises storing each of the created database records in the knowledge database.

4. The method of claim 1 wherein:

the file is a semi-structured data entity, comprising a plurality of predefined types of information at least some of which comprise information expressed in natural language form.

5. The method of claim 1 wherein:

each analyzing comprises parsing by computer.

6. The method of claim 1 further comprising:

checking an identified item of information for consistency between a plurality of the identified types of information; and in response to determining that the identified item of information is not consistent between the plurality of identified types of information, generating a warning.

7. The method of claim 1 wherein:

the file of information is either a first or a second kind of file; and analyzing the file comprises analyzing the file by computer to determine the kind of the file, in response to determining that the file is of the first kind, analyzing the file and the information by a first program-implemented information filter, and in response to determining that the file is of the second kind, analyzing the file and the information by a second program-implemented information filter.

8. The method of claim 1 wherein: analyzing by computer the information of the identified types comprises parsing the information of a said identified type using keywords or phrases.

9. The method of claim 1 wherein:

analyzing by computer the information of the identified types comprises parsing the information of a said identified type by executing said intelligent filter that uses keyword-based or phrase-based heuristics.

10. An apparatus that performs the method of claim 1 or 2 or 3 or 4 or 5 or 6 or 7 or 8 or 9.

11. A computer-readable medium containing instructions which, when executed in a computer, cause the computer to perform the method of claim 1 or 2 or 3 or 4 or 5 or 6 or 7 or 8 or 9.

* * * * *